US010789437B1

(12) United States Patent
Zhang et al.

(10) Patent No.: US 10,789,437 B1
(45) Date of Patent: Sep. 29, 2020

(54) SPLIT-TYPE CODE READING APPARATUS

(71) Applicant: Alibaba Group Holding Limited, George Town (KY)

(72) Inventors: Mingwei Zhang, Hangzhou (CN); Fenghuan Gu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/815,896

(22) Filed: Mar. 11, 2020

Related U.S. Application Data

(63) Continuation of application No. PCT/CN2020/071285, filed on Jan. 10, 2020.

(30) Foreign Application Priority Data

May 30, 2019 (CN) .......................... 2019 1 0463754

(51) Int. Cl.
*G06K 7/10* (2006.01)
*G06K 7/14* (2006.01)
(52) U.S. Cl.
CPC ........... *G06K 7/109* (2013.01); *G06K 7/1096* (2013.01); *G06K 7/1417* (2013.01)
(58) Field of Classification Search
CPC .................................................. G06K 7/109
USPC .................................................. 235/472.01
See application file for complete search history.

(56) References Cited

U.S. PATENT DOCUMENTS

| 5,883,375 | A | 3/1999 | Knowles et al. |
| 7,556,203 | B2 * | 7/2009 | Robinson ........... G06K 7/10881 235/462.45 |
| 2003/0222150 | A1 * | 12/2003 | Sato .................. G06K 7/10881 235/472.02 |
| 2009/0127343 | A1 | 5/2009 | Chiang |

(Continued)

FOREIGN PATENT DOCUMENTS

| CN | 206684859 | 11/2017 |
| CN | 207302240 | 5/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Toan C Ly
(74) *Attorney, Agent, or Firm* — Fish & Richardson P.C.

(57) ABSTRACT

The present specification provides a two-part code reading apparatus, including: a supporting base with a reading window that comprises: a cavity formed in the supporting base; a reflector disposed on one side of the cavity, wherein the reflector is parallel to a flat surface when the supporting base is placed on the flat surface; a translucent plate that covers an opening of the cavity and forms an acute angle with the reflector; and a hole disposed on a side of the cavity opposite to the reflector, the hole allows light to pass through; and a handheld code scanner with a camera, wherein the camera is aligned with the hole when the handheld code scanner is detachably placed on the supporting base, so that incoming light reflected by the reflector is capable of being directed to the camera through the hole.

17 Claims, 4 Drawing Sheets

(56) References Cited

U.S. PATENT DOCUMENTS

| | | | | |
|---|---|---|---|---|
| 2015/0126245 A1* | 5/2015 | Barkan | .............. | G06K 7/10732 |
| | | | | 455/556.1 |
| 2016/0188940 A1* | 6/2016 | Lu | ...................... | G06K 7/10722 |
| | | | | 235/462.41 |
| 2019/0243998 A1* | 8/2019 | Ford | .................. | G06K 7/10722 |

FOREIGN PATENT DOCUMENTS

| | | |
|---|---|---|
| CN | 207558116 | 6/2018 |
| CN | 207867518 | 9/2018 |
| CN | 110245531 | 9/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071285, dated Apr. 9, 2020, 18 pages (with machine translation).

PCT International Search Report and Written Opinion in International Application No. PCT/CN2020/071719, dated Apr. 16, 2020, 20 pages (with machine translation).

* cited by examiner

SPLIT-TYPE CODE READING APPARATUS

CROSS-REFERENCE TO RELATED APPLICATIONS

This application is a continuation of PCT Application No. PCT/CN2020/071285, filed on Jan. 10, 2020, which claims priority to Chinese Patent Application No. 201910463754.3, filed on May 30, 2019, and each application is hereby incorporated by reference in its entirety.

TECHNICAL FIELD

The present specification relates to information reading apparatuses, and in particular, to split-type code reading apparatuses.

BACKGROUND

With development of information technologies, graphic identifiers (graphic codes) that include specific information and that are manifested as barcodes or two-dimensional codes, etc. are widely attached to various articles, such as products in a shopping mall or a supermarket, books in a library or a bookstore, and various tickets and credentials, and are generated in intelligent devices such as smartphones and tablets. To effectively use the graphic codes like bar codes or two-dimensional codes, a code reading apparatus is needed to scan the graphic codes like bar codes or two-dimensional codes so as to read information carried in the graphic codes. In addition to conventional integrated code reading apparatuses, split-type code reading apparatuses have been developed to facilitate reading of various graphics codes.

A split-type code reading apparatus generally includes a base with a reading window and a handheld code scanner with a camera and that can be detachably placed on the base. On one hand, when the handheld code scanner is placed on the base, the code reading apparatus can scan a graphic code by using the camera of the handheld code scanner through the reading window on the base, so as to read information. On the other hand, when the handheld code scanner is detached from the base, an operator can hold the handheld code scanner to directly scan a graphic code by using the camera of the handheld code scanner, so as to read information. However, an existing split-type code reading apparatus is disadvantageous in a large volume, a heavy weight, and a high cost due to its design defects, and is inconvenient to use.

Therefore, the split-type code reading apparatus in the existing technology needs to be improved.

SUMMARY

An objective of the present specification is to overcome a defect in the existing technology by providing a split-type code reading apparatus. The split-type code reading apparatus is advantageous in a small volume, a light weight, a low cost, and ease of use.

According to an aspect of the present specification, a split-type code reading apparatus is provided, including: a base with a reading window, where the base can be settled on a support surface, and the reading window includes a cavity formed in the base, a reflector disposed in the cavity, a light transmitting plate mounted on the base and covering an outwardly-facing opening of the cavity, and a closed light transmitting hole at an end of the cavity and opposite to the reflector; and a handheld code scanner with a camera, where when the handheld code scanner is detachably placed on the base, the camera is aligned with the light transmitting hole, so that incident light from a graphic code to be scanned can reach the camera through the light transmitting hole after being reflected by the reflector, where the reflector is disposed parallel to the support surface of the base, and the light transmitting plate is disposed at an acute angle to the reflector.

In an implementation, the base has an inverted V-shaped composition formed by a first leg and a second leg, the reading window is disposed on the first leg, an accommodating part configured to receive the handheld code scanner is partially located on the first leg and partially located on the second leg, the handheld code scanner correspondingly forms an inverted V shape and has a short first part and a long second part, and the camera is disposed at an end of the first part.

In an implementation, the first leg and the second leg are constructed into flat bodies, and an included angle between the first leg and the second leg ranges from 90° to 120°.

In an implementation, the first leg and the second leg are injection-molded from a plastic material.

In an implementation, the first leg and the second leg can be rotatably connected.

In an implementation, the included angle between the first leg and the second leg is adjustable.

In an implementation, the base and the handheld code scanner are configured as follows: when the handheld code scanner is placed on the base, a top surface of the first part stays flush with a top surface of the first leg, and a side surface of the handheld code scanner stays flush with a side surface of the base.

In an implementation, a first display screen is disposed on a top surface of the second part of the handheld code scanner.

In an implementation, a second display screen is disposed on a top surface of the first part of the handheld code scanner.

In an implementation, a pass-through opening is disposed on the second leg, a charging cable interface connected to a circuit board in the second leg is disposed on a side wall of the opening, an inwardly concave groove is disposed below the opening, a conductive contact point connected to the circuit board is further disposed on a top surface of the second leg, and when the handheld code scanner is placed on the base, the conductive contact point is in contact with a conductive contact point on a bottom surface of the second part.

According to the code reading apparatus in the present specification, as the reflector is disposed parallel to the support surface of the base, and the light transmitting plate is disposed at an acute angle to the reflector, a reflector with a smaller reflection area can be used, and the base with the reflector mounted inside can be made in a smaller size. As such, the code reading apparatus has a smaller volume, a lighter weight, and a lower cost, and is easy to use.

DESCRIPTION OF IMPLEMENTATIONS

The following describes in detail example implementations of the present specification with reference to examples. A person skilled in the art should understand that these example implementations do not constitute any limitation on the present specification.

Figure 1:
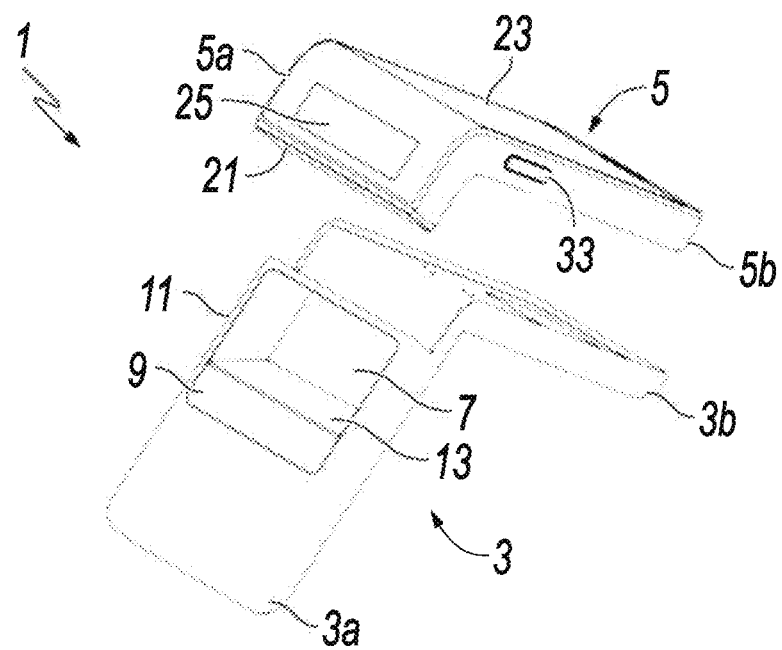
FIG. 1 is a 3D schematic diagram illustrating a split-type code reading apparatus, according to an example implementation of the present specification, where a handheld code scanner is separated from a base.
Figure 2:
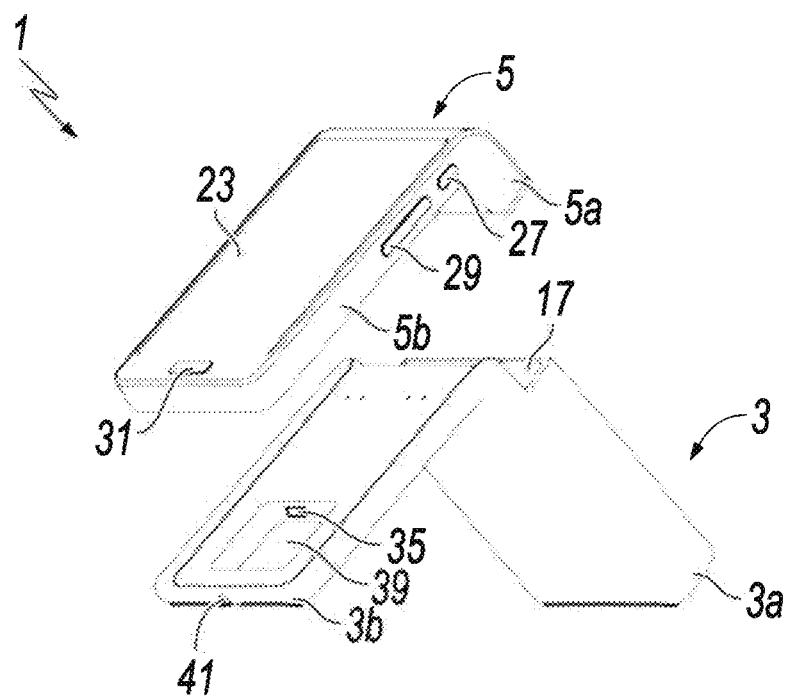
FIG. 2 is another 3D schematic diagram illustrating a split-type code reading apparatus, according to an example implementation of the present specification, where a handheld code scanner is separated from a base.
Figure 3:
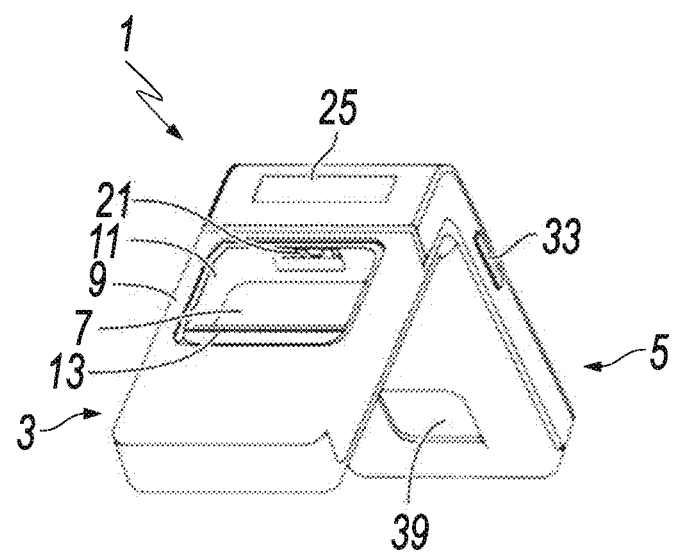
FIG. 3 is a 3D schematic diagram illustrating a split-type code reading apparatus, according to an example implementation of the present specification, where a handheld code scanner is placed on a base.
Figure 4:
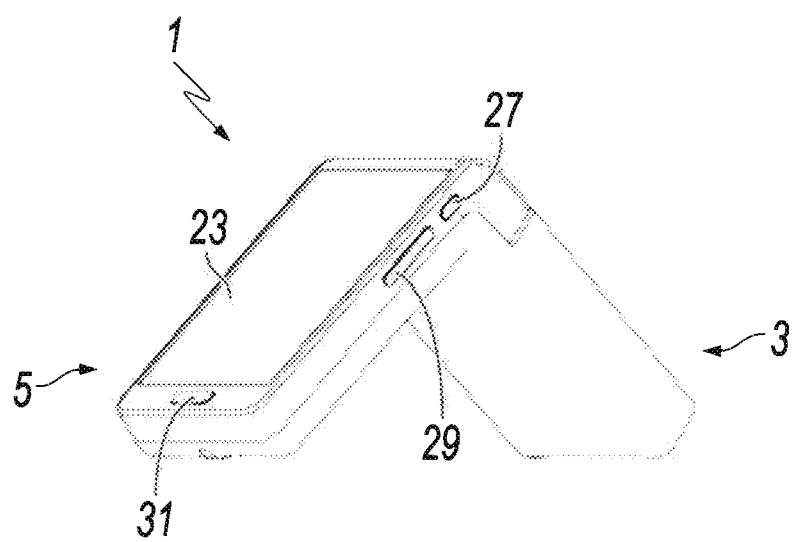
FIG. 4 is another 3D schematic diagram illustrating a split-type code reading apparatus, according to an example implementation of the present specification, where a handheld code scanner is placed on a base.
Figure 5:
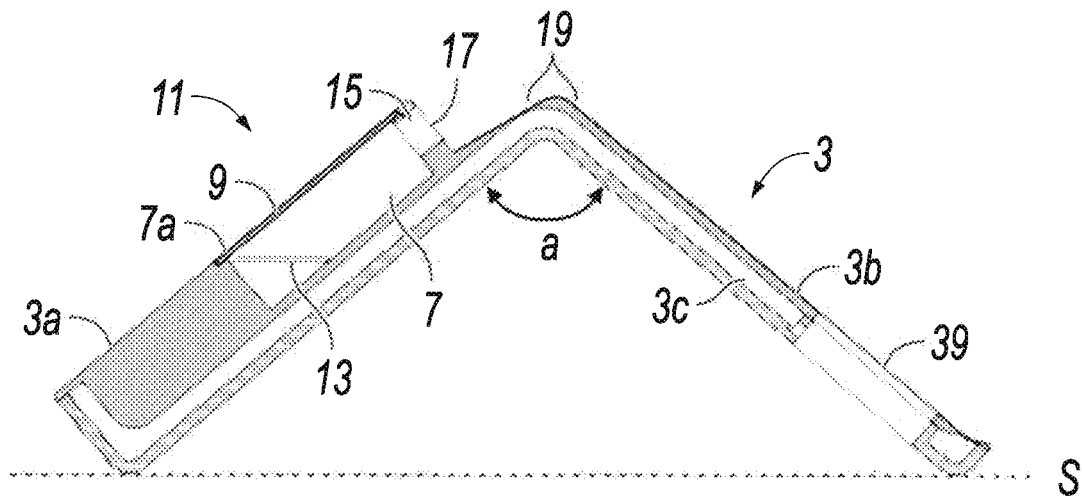
FIG. 5 is a cross-sectional view schematically illustrating a base of a split-type code reading apparatus, according to an example implementation of the present specification.

FIG. 1 is a 3D schematic diagram illustrating a split-type code reading apparatus, according to an example implementation of the present specification, where a handheld code scanner is separated from a base. FIG. 2 is another 3D schematic diagram illustrating a split-type code reading apparatus, according to an example implementation of the present specification, where a handheld code scanner is separated from a base. FIG. 3 is a 3D schematic diagram illustrating a split-type code reading apparatus, according to an example implementation of the present specification, where a handheld code scanner is placed on a base. FIG. 4 is another 3D schematic diagram illustrating a split-type code reading apparatus, according to an example implementation of the present specification, where a handheld code scanner is placed on a base. FIG. 5 is a cross-sectional view schematically illustrating a base of a split-type code reading apparatus, according to an example implementation of the present specification.

As shown in FIG. 1 to FIG. 5, a split-type code reading apparatus 1 according to the example implementations of the present specification includes a base 3 and a handheld code scanner 5. The base 3 can be settled on a support surface S. A cavity 7 is formed in the base 3. An outwardly-facing opening 7a of the cavity 7 is mounted on the base 3 and covered by a light transmitting plate 9 made of a material such as glass or transparent plastic, to form a reading window 11 of the base 3. A reflector 13 is disposed in the cavity 7 of the reading window 11, the reflector 13 is disposed substantially parallel to the support surface S of the base 3, and the light transmitting plate 9 is disposed at an acute angle to the reflector 13. A light transmitting hole 15 is disposed in the base 3 at an end opposite to the reflector 13 in the cavity 7. The light transmitting hole 15 can also be covered by a light transmitting plate 17 made of material such as glass or transparent plastic, so that an enclosed space is formed inside the cavity 7 to prevent dust and dirt from falling on the reflector 13. An accommodating part 19 configured to receive the handheld code scanner 5 is further formed on the base 3.

Figure 6:
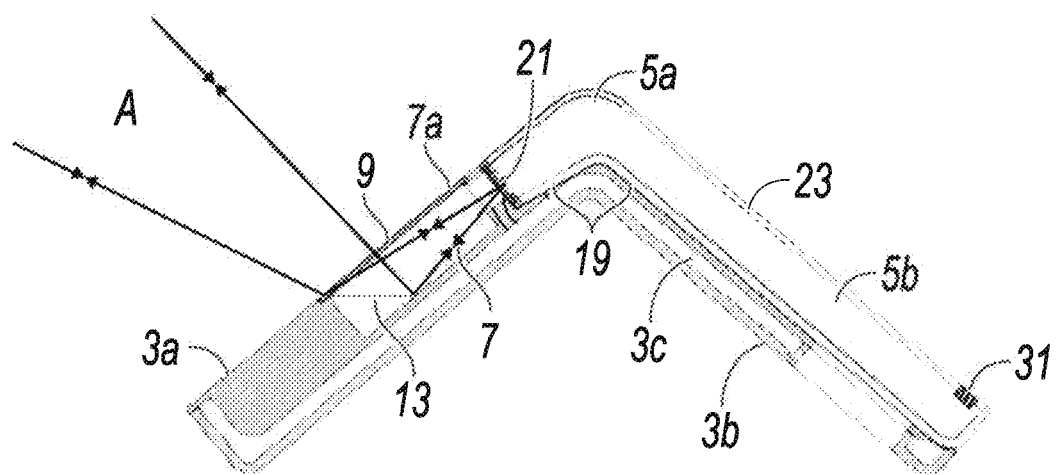
FIG. 6 is a cross-sectional view illustrating a split-type code reading apparatus with a handheld code scanner placed on a base, according to an example implementation of the present specification, where an optical path is schematically displayed.

FIG. 6 is a schematic side cross-sectional view illustrating a split-type code reading apparatus with a handheld code scanner placed on a base, according to an example implementation of the present specification, where an optical path is schematically displayed. In FIG. 6, an arrow line represents a path of light, and A represents a beam collection and identification range or a code scanning and identification area of the handheld code scanner when the handheld code scanner is placed on the base. For simplicity, an internal structure of the handheld code scanner 5 is not shown in FIG. 6. As shown in FIG. 6, when the handheld code scanner 5 is received on the accommodating part 19, a camera 21 of the handheld code scanner 5 can be substantially aligned with the light transmitting hole 15. As such, incident light from a graphic code (not shown) to be scanned can reach the camera of the handheld code scanner 5 through the light transmitting hole 15 after being reflected by the reflector 13, so that the camera can scan the graphic code to read information carried on the graphic code.

The reflector 13 disposed substantially parallel to the support surface S of the base 3 according to the present specification can have a larger beam collection and identification range, namely, a larger code scanning and identification area than a configuration where a reflector that is disposed obliquely relative to a support surface of a base and that has a same reflection area. In other words, to obtain a beam collection and identification range or code scanning and identification area A of a same size, the reflector 13 disposed substantially parallel to the support surface S of the base 3 according to the present specification can have a smaller reflection area than the configuration where the reflector is disposed obliquely relative to the support surface of the base. As such, as the reflector with a smaller reflection area can be used, the base with the reflector mounted inside can also be made in a smaller size, thereby implementing a smaller volume, a lighter weight, and a lower cost.

To further reduce the weight of the base 3, the base 3 can have an inverted-V shape composition including a first leg 3a and a second leg 3b. The reading window 11 with the reflector 13 disposed on its inner side can be disposed on one of the first leg 3a and the second leg 3b, for example, disposed on the first leg 3a. The accommodating part 19 configured to receive the handheld code scanner 5 is partially located on the first leg 3a and partially located on the second leg 3b. The handheld code scanner 5 correspondingly forms an inverted V shape and has a short first part 5a and a long second part 5b. The camera 21 is disposed at an end of the shorter first part 5a of the L-shaped handheld code scanner 5. When the handheld code scanner 5 is placed on the base 3, the shorter first part 5a of the handheld code scanner 5 is received in a part of the accommodating part 19 that is on the first leg 3a, so that the camera 21 is aligned with the light transmitting hole 15 and faces the reflector 13, and the longer second part 5b of the handheld code scanner 5 is received in a part of the accommodating part 19 that is on the second leg 3b. When the handheld code scanner 5 is detached from the base 3, the longer second part 5b of the handheld code scanner 5 enable an operator to grasp the handheld code scanner 5.

The first leg 3a and the second leg 3b are preferably constructed into light flat bodies, and an included angle α between the first leg 3a and the second leg 3b preferably ranges from 90° to 120°, more preferably 100°, so that the code scanning and identification area formed through the reading window 11 of the base 3 is located in a position that easily covers various graphic codes to be scanned, to be specific, various graphic codes to be scanned can be conveniently scanned. The first leg 3a and the second leg 3b are usually injection-molded from plastic material. A reinforcer 3c made by metal or other material can be disposed in the base 3, so as to improve strength of the light and thin base 3.

In an example implementation, the first leg 3a and the second leg 3b of the base 3 are integrated. However, it should be understood that, the first leg 3a and the second leg 3b of the base 3 can alternatively be rotatably connected, for example, connected by using a hinge. The first leg 3a and the second leg 3b can be rotated and folded together when they are not being used, thereby reducing occupied storage space. The first leg 3a and the second leg 3b can be rotated and unfolded and be settled on the support surface when they are being used. In addition, the included angle between the first leg 3a and the second leg 3b can be adjusted as needed, so as to obtain a proper code scanning and identification area. A locking apparatus can be further disposed if needed, and the first leg 3a and the second leg 3b can be locked in a proper adjusted position.

Sizes of the base 3 and the handheld code scanner 5 can be preferably designed as follows: When the handheld code scanner 5 is placed on the base 3, a top surface of the shorter first part 5a of the handheld code scanner 5 stays flush with a top surface of the first leg 3a, and a side surface of the handheld code scanner 5 stays flush with a side surface of the base 3, so that the code reading apparatus 1 has a simple and compact overall structure.

A first display screen 23 is disposed on a top surface of the longer second part 5b of the handheld code scanner 5, and the first display screen 23 can be configured to display information about a read graphic code to an operator and enable the operator to enter instructions and/or information when needed, for example, display a payment amount when the code reading apparatus 1 serves as a payment code scanning apparatus. A second display screen 25 is disposed on a top surface of the shorter first part 5a of the handheld code scanner 5, and the second display screen 25 is also configured to display information about a read graphic code to, typically, other persons such as a user.

A power switch 27 can be disposed on a side of the second part 5b of the handheld code scanner 5, and is configured to turn on or off the handheld code scanner 5. A first code scanning button 29 can further be disposed on a side of the second part 5b of the handheld code scanner 5, and preferably, a second code scanning button 31 can further be disposed on a lower side of the first display screen 23 on the top surface of the second part 5b. The handheld code scanner 5 can scan a graphic code to read information carried by the graphic code when either the first code scanning button 29 or the second code scanning button 31 is pressed. A volume adjustment button 33 can further be disposed on the other side of the second part 5b of the handheld code scanner 5 to adjust a volume of an audio prompt played by the handheld code scanner 5.

As known, optical components, electronic components, batteries, etc. that are configured to perform a code scanning and reading function are disposed inside the handheld code scanner 5. The present specification does not relate to an improvement on an internal structure of the handheld code scanner 5. Therefore, details are omitted here for simplicity.

Figure 7:
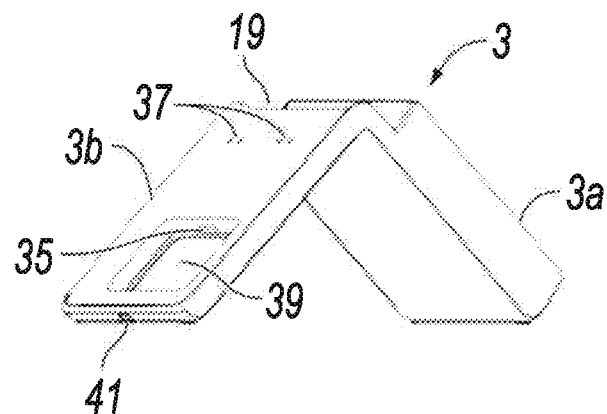
FIG. 7 is a 3D schematic diagram illustrating a base of a split-type code reading apparatus, according to an example implementation of the present specification.
Figure 8:
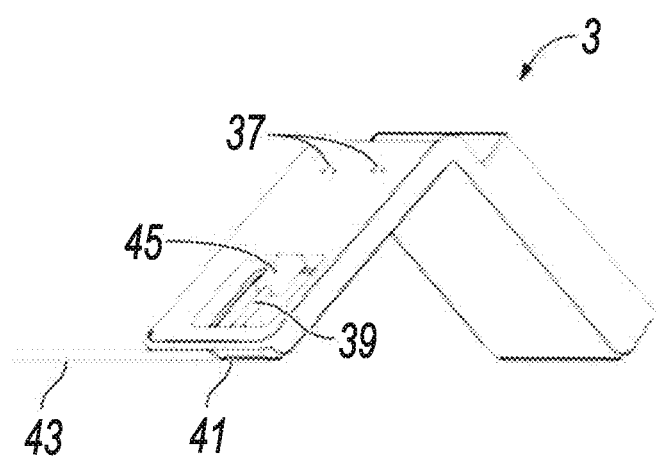
FIG. 8 is a 3D schematic diagram illustrating a base of a split-type code reading apparatus, according to an example implementation of the present specification, where a charging cable is inserted into the base.

FIG. 7 is a 3D schematic diagram illustrating a base of a split-type code reading apparatus, according to an example implementation of the present specification. FIG. 8 is a 3D schematic diagram illustrating a base of a split-type code reading apparatus, according to an example implementation of the present specification, where a charging cable is inserted into the base. The handheld code scanner 5 can be charged when placed on the base 3. For this, a circuit board (not shown) and a charging cable interface 35, such as a USB interface, connected to the circuit board can be disposed in the second leg 3b of the base 3. A conductive contact point 37 connected to the circuit board is further disposed on a top surface of the second leg 3b of the base 3. When the handheld code scanner 5 is placed on the base 3, a conductive contact point (not shown) on a bottom surface of the second part 5b of the handheld code scanner 5 is in contact with the conductive contact point 37 on the top surface of the second leg 3b of the base 3, so as to charge the handheld code scanner 5. Preferably, a pass-through opening 39 is disposed on the second leg 3b of the base 3. The circuit board disposed in the second leg 3b is located above the opening 39. The charging cable interface 35 is disposed on a side wall of the opening 39 that is close to the circuit board. A groove 41 inwardly concave from a bottom surface of the second leg 3b is disposed below the opening 39. Certainly, the groove 41 can also be inwardly concave from the top surface of the second leg 3b. As such, a charging cable plug 45 connected to a conducting wire 43 can be inserted into the charging cable interface 35 through the opening 39, so that the conducting wire 43 is inserted into the groove 41. As a result, the charging cable plug 45 is not exposed to an outer side of the second leg 3b, thereby reducing interference to an external environment.

Although the present specification are described in detail with reference to the example implementations of the present specification, it should be understood that, the detailed description is merely intended to explain but not limit the present specification. The scope of the present specification is subject to the technical solutions described in the claims.

What is claimed is:
1. An apparatus for two-part barcode reading, comprising:
   a supporting base with a reading window that comprises:
      a cavity formed in the supporting base;
      a reflector disposed on one side of the cavity, wherein the reflector is parallel to a flat surface when the supporting base is placed on the flat surface;
      a translucent plate that covers an opening of the cavity and forms an acute angle with the reflector; and
      a hole disposed on a side of the cavity opposite to the reflector, the hole allowing light to pass through; and
   a handheld code scanner with a camera, wherein the camera is aligned with the hole when the handheld code scanner is detachably placed on the supporting base, so that incoming light reflected by the reflector is capable of being directed to the camera through the hole, wherein the handheld code scanner comprises a first part and a second part which form a shape of an inverted V, the first part is shorter than the second part, and the camera is disposed at an end of the first part.

2. The apparatus according to claim 1, wherein the supporting base comprises a first leg and a second leg that form a shape of an inverted V, wherein the reading window is disposed on the first leg.

3. The apparatus according to claim 2, wherein a rotatable range of the first leg and the second leg that are rotatably hinged is between 90° to 120°.

4. The apparatus according to claim 2, wherein the supporting base further comprises a top accommodating surface formed to accommodate the handheld code scanner, wherein the top accommodating surface is located partially on the first leg and partially on the second leg.

5. The apparatus according to claim 4, wherein the handheld code scanner is accommodated by the top accommodating surface.

6. The apparatus according to claim 4, wherein the second leg comprises a circuit board and an opening, a charging cable socket connected to the circuit board is disposed on a side wall of the opening.

7. The apparatus according to claim 6, wherein a concave groove is disposed below the opening.

8. The apparatus according to claim 6, wherein at least one conductive contact point connected to the circuit board is disposed on a top surface of the second leg.

9. The apparatus according to claim 8, wherein the at least one conductive contact point is in contact with at least one corresponding conductive contact point disposed on a bottom surface of the second part when the handheld code scanner is accommodated by the top accommodating surface.

10. The apparatus according to claim 2, wherein the first leg and the second leg are rotatably hinged.

11. The apparatus according to claim 2, wherein the first leg and the second leg are made in plastic material through injection-molding.

12. The apparatus according to claim 2, wherein a top surface of the first part is flush with a top surface of the first leg and both sides of the handheld code scanner are flush with their corresponding sides of the supporting base.

13. The apparatus according to claim 2, wherein the reflector is disposed on the first leg.

14. The apparatus according to claim 1, wherein a first display screen is disposed on a top surface of the second part of the handheld code scanner.

15. The apparatus according to claim 14, wherein a second display screen is disposed on a top surface of the first part of the handheld code scanner.

16. The apparatus according to claim 1, wherein the translucent plate is made of glass or transparent plastic.

17. The apparatus according to claim 1, wherein the hole is covered by a light transmitting plate so that an enclosed space is formed inside the cavity to prevent dust or dirt from falling on the reflector.

* * * * *